US008364180B2

(12) United States Patent
Harris et al.

(10) Patent No.: US 8,364,180 B2
(45) Date of Patent: Jan. 29, 2013

(54) TELECOMMUNICATIONS SYSTEM FOR COMMUNICATING A SMS MESSAGE TO A MOBILE USER ON AN IP NETWORK

(75) Inventors: Martin Barkley Harris, Bristol (GB); Nick Sampson, Bristol (GB); Nigel Stuart Bird, Weston-Super-Mare (GB)

(73) Assignee: Orange SA, Paris (FR)

( * ) Notice: Subject to any disclaimer, the term of this patent is extended or adjusted under 35 U.S.C. 154(b) by 0 days.

(21) Appl. No.: 10/574,737

(22) PCT Filed: Oct. 7, 2004

(86) PCT No.: PCT/GB2004/004258
§ 371 (c)(1),
(2), (4) Date: Apr. 3, 2006

(87) PCT Pub. No.: WO2005/036902
PCT Pub. Date: Apr. 21, 2005

(65) Prior Publication Data
US 2007/0123277 A1 May 31, 2007

(30) Foreign Application Priority Data
Oct. 8, 2003 (GB) .................................. 0323601.5

(51) Int. Cl.
*H04W 4/00* (2009.01)

(52) U.S. Cl. .................. 455/466; 455/412.1; 455/432.1; 455/433; 370/356

(58) Field of Classification Search .................. 455/466, 455/403, 433, 432.1, 422.1; 709/206, 204; 370/356
See application file for complete search history.

(56) References Cited

U.S. PATENT DOCUMENTS 6,370,390 B1   4/2002   Salin et al. .................... 455/466
(Continued)

FOREIGN PATENT DOCUMENTS

EP   1 377 086 A1   1/2004
(Continued)

OTHER PUBLICATIONS

Second Generation Mobile and Wireless Networks (Hardcover) by Uyless Black Publisher: Prentice Hall PTR; 1st edition ISBN-10: 0136212778 ISBN-13: 978-0136212775.*

(Continued)

*Primary Examiner* — Rafael Pérez-Gutiérrez
*Assistant Examiner* — Suhail Khan
(74) *Attorney, Agent, or Firm* — Haverstock & Owens LLP

(57) ABSTRACT

A telecommunications system provides a facility for communicating a Short Message Service (SMS) message to a mobile user equipment using a subscriber identity number when the mobile user equipment is communicating via an Internet Protocol network using an Internet Protocol (IP) communication being terminated on the IP network. The system comprises an SMS network including a Short Message Service Center (SM-SC), a gateway mobile switching center (GMSC), the SMS network providing a facility for communicating SMS messages, and an Internet Protocol/SMS (IP/SMS) gateway for communicating between the SMS network and the IP network. The system also includes a home location database for maintaining address data identifying a current location of a mobile user equipment. The gateway mobile switching center is operable in response to the SMS message to interrogate the home location database for an address to which the SMS message should be sent. The home location database is operable to provide the gateway mobile switching center with an address of the IP/SMS gateway, which has been stored in association with the subscriber identity number. The gateway switching center is operable to send the SMS message to the IP/SMS gateway. The IP/SMS gateway is operable to retrieve an Internet Protocol address corresponding to the mobile subscriber number pre-stored in an IP/SMS database associated with the IP/SMS gateway. The IP/SMS gateway communicates the SMS message to the mobile user equipment at the retrieved IP address via the IP network.

16 Claims, 2 Drawing Sheets

U.S. PATENT DOCUMENTS

| | | | |
|---|---|---|---|
| 6,611,516 B1 | 8/2003 | Pirkola et al. | 370/352 |
| 6,801,781 B1* | 10/2004 | Provost et al. | 455/466 |
| 2001/0036173 A1* | 11/2001 | Shmulevich et al. | 370/352 |
| 2002/0103929 A1 | 8/2002 | Molnar | 709/239 |
| 2003/0018806 A1 | 1/2003 | Rueger et al. | 709/238 |
| 2003/0064706 A1 | 4/2003 | Ala-Luukko et al. | 455/412 |

FOREIGN PATENT DOCUMENTS

| | | |
|---|---|---|
| WO | WO 98/58476 | 12/1998 |
| WO | WO 00/79825 A1 | 12/2000 |
| WO | WO 02/054800 A2 | 7/2002 |
| WO | WO 02/082836 A1 | 10/2002 |

OTHER PUBLICATIONS

GSM 3GPP TR 23.040 V4.8.0 (Jun. 2003).*
Second Generation Mobile and Wireless Networks (Hardcover) by Uyless Black Publisher: Prentice Hall PTR; 1st edition ISBN-10:0136212778 ISBN-13:978-0136212775.*
GSM 3GPP TS 23.040 V4.8.0 (Jun. 2003).*

* cited by examiner

TELECOMMUNICATIONS SYSTEM FOR COMMUNICATING A SMS MESSAGE TO A MOBILE USER ON AN IP NETWORK

FIELD OF THE INVENTION

The present invention relates to telecommunications systems for communicating Short Message Service (SMS) messages to user equipment identified by subscriber identity numbers.

BACKGROUND OF THE INVENTION

The Short Message Service provided for communicating text messages between user equipment has proved to be one of the most utilised applications of the GSM system. Although an SMS message provides only a relatively low communications bandwidth, for non-real time data communications, the popularity of the SMS for text messaging has meant that a demand for the SMS is likely to remain, even though future generation mobile radio systems may offer higher bandwidth communications. Thus, although future generation mobile radio systems may support alternative access technologies, and therefore more a convenient data communications facility, there will exist a requirement to deliver SMS messages to user equipment, even though the user equipment may have a facility for communicating using these alternative access technologies. This is because SMS messages may be generated by SMS enabled user equipment from GSM or UMTS networks.

SUMMARY OF INVENTION

According to the present invention there is provided a telecommunications system for communicating a Short Message Service (SMS) message to a user equipment using a subscriber identity number terminating on an Internet Protocol (IP) network, communication being effected via the IP network using an Internet Protocol. The system comprises an SMS network including a short message service centre (SM-SC), a gateway mobile switching centre (GMSC), the SMS network providing a facility for communicating SMS messages, and an Internet Protocol/SMS (IP/SMS) gateway for communicating between the SMS network and the IP network. The system also includes a home location database for maintaining address data identifying a current location of a user equipment. The gateway mobile switching centre is operable in response to the SMS message received from the short message service centre to interrogate the home location database for an address to which the SMS message should be sent. The home location database is operable to provide the gateway mobile switching centre with an address of the IP/SMS gateway stored in the home location database in association with the subscriber identity number. The gateway mobile switching centre is operable to send the SMS message to the IP/SMS gateway. The IP/SMS gateway is operable to retrieve an Internet Protocol address corresponding to the subscriber identity number pre-stored in an IP/SMS database associated with the IP/SMS gateway. The IP/SMS gateway communicates the SMS message to the user equipment at the retrieved IP address via the IP network. The IP network includes an authentication server, which is operable to determine the IP/SMS gateway address from the IP network via which the user equipment is communicating. The authentication server communicates the IP/SMS gateway address to the home location database, the IP/SMS gateway address being stored in the home location database in association with the subscriber identity number for retrieval by the gateway mobile switching centre in response to the received SMS message.

Embodiments of the present invention provide a facility for communicating an SMS message to a user equipment, when the user equipment is communicating using an Internet Protocol. Although SMS messaging was originally developed within the Global System for Mobiles (GSM) standard, user equipment may be arranged to utilise other forms of access interface, such as a Wireless Local Area Network (WLAN), or an access interface that does not use radio technology, such as for example Asynchronous Digital Subscriber Line (ADSL) technology. As such, there is a requirement for an SMS message to be delivered via an IP layer, when the user equipment is communicating via an IP network such as for example a Wireless LAN. The present invention has therefore been devised to provide a facility for communicating an SMS message to a user equipment, when that user equipment is attached to an IP network and is therefore acting as an IP client. To provide this facility, embodiments of the present invention include an IP/SMS gateway which forms an interface between an SMS network for communicating SMS messages and an IP network to which the user equipment is currently attached. The IP/SMS gateway is provided with a database (IP/SMS database) which includes an IP address of the user equipment stored in association with a subscriber identifier number (MSISDN) of the user equipment to which the SMS message is to be communicated. The IP/SMS gateway can therefore route the SMS message, encapsulated as an IP packet to the user equipment, by retrieving the IP address from the IP/SMS database using the subscriber identity number included with the SMS message.

As will be appreciated the user equipment, which is connected to the IP network, may or may not be mobile so that the term "user equipment" should not necessarily imply that the user equipment is mobile. However, it will be appreciated that embodiments of the present invention find application with a mobile user equipment which roams into a coverage area of an IP network and so receives the SMS message via the IP network.

In some embodiments, the home location database is arranged to store for at least the subscriber identity number of the user equipment, a flag indicative of whether the user equipment is currently communicating via the IP network. If the flag is set to indicate that the user equipment is currently communicating via the IP network, the home location database can provide the address of the IP/SMS gateway to which SMS messages should be sent. An efficient arrangement is therefore provided for the gateway mobile switching centre to receive the address of the IP/SMS gateway for delivering the SMS message when the user equipment is terminated on an IP network. According to such embodiments, the user equipment may change affiliation between the IP network and a cellular network rapidly, or may be arranged to communicate contemporaneously via the IP network and the cellular network. As such the selection of a preferred network for delivery of the SMS message can be made using the flag set in the home location database. If the flag is not set then the SMS message will be routed via a serving GPRS support node to be delivered to the user equipment via a conventional cellular mobile network.

According to an aspect of the present invention there is provided a home location database for maintaining address data identifying a current location of a user equipment. The address data provides an address to which an SMS message addressed to the user equipment at a subscriber identity number should be sent. The home location database is arranged to provide a gateway mobile switching centre with an address of an IP/SMS gateway for communicating the SMS message to the user equipment at the subscriber identity number, when the user equipment is communicating via an Internet Protocol network using an Internet Protocol (IP), communication being terminated on the IP network. The home location database is arranged to store for at least the subscriber identity number of the user equipment, a flag indicative of whether the user equipment is currently communicating via the IP network, and if the flag is set to indicate that the user equipment is currently communicating via the IP network, an address of the IP/SMS gateway to which SMS messages should be sent.

The term home location database is intended to provide a generic expression which includes within its scope a home location register and a home subscriber server which are terms more usually used with reference to second and third generation mobile networks.

The term subscriber identity number is used to describe a generic expression which includes within its scope the Mobile Subscriber ISDN Number (MSISDN) which is the term more usually used with reference to second and third generation networks.

Embodiments of the present invention provide a system for delivering SMS messages to and sending SMS messages from a user equipment which is connected via an IP network and has a pre-existing IP address. As part of the existing GSM UMTS standard the gateway mobile switching centre (GMSC) interrogates a home location database for an address to which the SMS message should be sent. The SMS message is generated for a particular subscriber identity number, which identifies a particular user equipment. Since a mobile user equipment may roam to another network, the home location database maintains data identifying a current location of the mobile including an address of a current network to which the SMS message should be forwarded. Embodiments of the present invention are arranged to provide a home location database with an address of an SMS/IP gateway, when a user equipment is attached to an IP network. Accordingly, the system is compatible with existing SMS messaging and message formats, whereby existing elements of a GSM or UMTS network, for example the SM-SC, the Gateway MSC, and an SMS-InterWorking MSC can be utilised. Furthermore, embodiments of the present invention can provide flexibility in that protocols for use in transporting an SMS message between the IP connected user equipment and the network can be freely selected without imposing any requirements with respect compatibility with the system.

Various further aspects and features of the present inventions are defined in the appended claims.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE PREFERRED EMBODIMENTS

Example of an Existing GSM UMTS System

Figure 1:
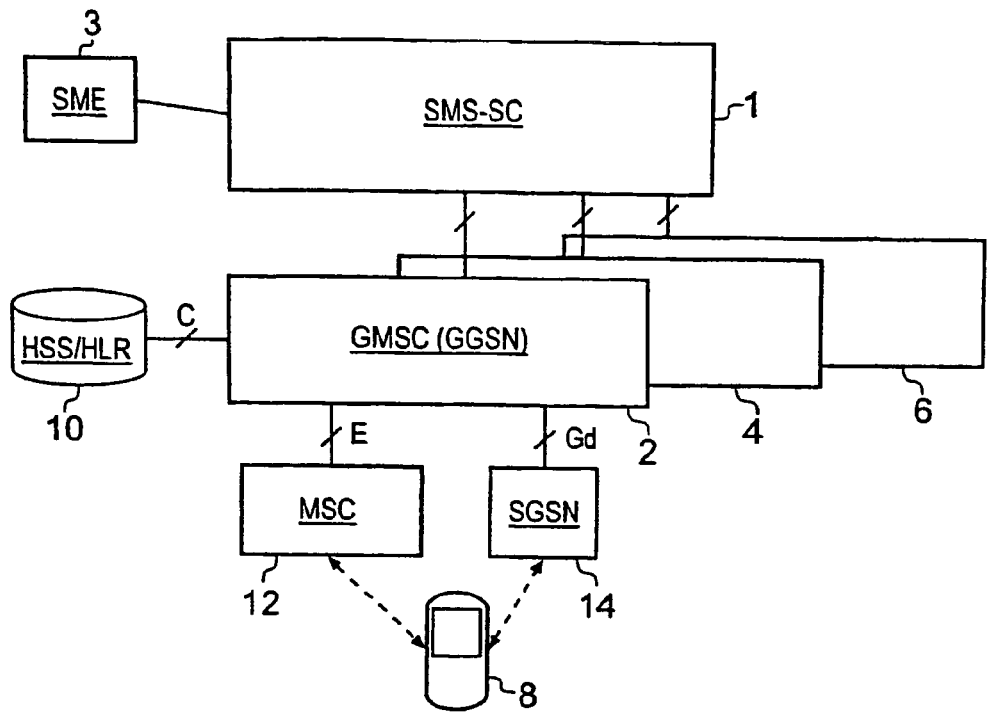
FIG. 1 is a schematic block diagram of a system according to the GSM/UMTS standard for communicating SMS messages.

FIG. 1 provides an example block diagram of a GSM/UMTS system, which is arranged to communicate SMS messages to user equipment at a subscriber identity number. The subscriber identity number provides a unique number (Mobile Subscriber ISDN Number (MSISDN)) which identifies a user from a (Universal) Subscriber Identity Module ((U)SIM) incorporated into the user equipment In FIG. 1, a Short Message-Service Centre (SM-SC) 1, receives and distributes SMS messages to user equipment via mobile networks. The SMS messages are distributed to the user equipment using the subscriber identity numbers provided with the SMS messages. The SMS messages are distributed to Gateway Mobile Switching Centres 2, 4, 6, of the networks where the user equipment are attached. For one example network, FIG. 1 provides an illustration of parts, which are involved in delivering an SMS message to a user equipment 8.

In the following explanation of example embodiments of the invention, it will be assumed that the user equipment 8 is mobile and roams into a coverage area of a wireless access communications network which is arranged to communicate data using an Internet Protocol. However, it will be appreciated that in other embodiments the user equipment may not be mobile, in the sense that the user equipment may be permanently or semi-permanently connected to the IP network.

According to the GSM/UMTS architecture, the Gateway Mobile Switching Centre (GMSC) receives the SMS message from the Short Message-Service Centre (SM-SC) 1. The SMS message generated by an Short Message Entity (SME) 3 is sent to the SM-SC 1 in accordance with the known standard. The SM-SC 1 forwards the SMS message to the GMSC 2 for the mobile network identified by the subscriber identity number. GMSC 2 determines a location of the mobile user equipment by interrogating a Home Location Register (HLR) 10. The HLR 10 provides an address of a Mobile Switching Centre (MSC) 12 or a Serving GPRS Support Node (SGSN) 14 to which the mobile user equipment 8 is currently attached, for a GSM or a GPRS network respectively. The HLR maintains an address of the MSC/SGSN to which the SMS message should be sent. The HLR therefore maintains an address of the MSC/SGSN of the mobile network to which the mobile user equipment is currently attached, the address being stored in association with the subscriber identity number of the mobile user equipment. The GMSC therefore retrieves the address of the MSC/SGSN using the subscriber identity number provided with the SMS message. The SMS message is then transmitted to the mobile user equipment 8 in accordance with the GSM/UMTS standard.

The interfaces between the GMSC and the HLR 10, the MSC 12 and the SGSN 14 are defined in accordance with the GSM/UMTS standard and are referred to as C, E and Gd interfaces.

The above explanation of the operation of the GSM/UMTS system of FIG. 1 for delivering an SMS message, provides a representation of an SMS message communication to a mobile user equipment which is identified by its mobile subscriber ISDN number (MSISDN) as defined in TS 23.040 [1]. A system for delivering an SMS message to a mobile user equipment via other wireless access technologies such a Wireless-LAN is provided in FIG. 2.

System for Delivering SMS Messages to IP Clients

Figure 2:
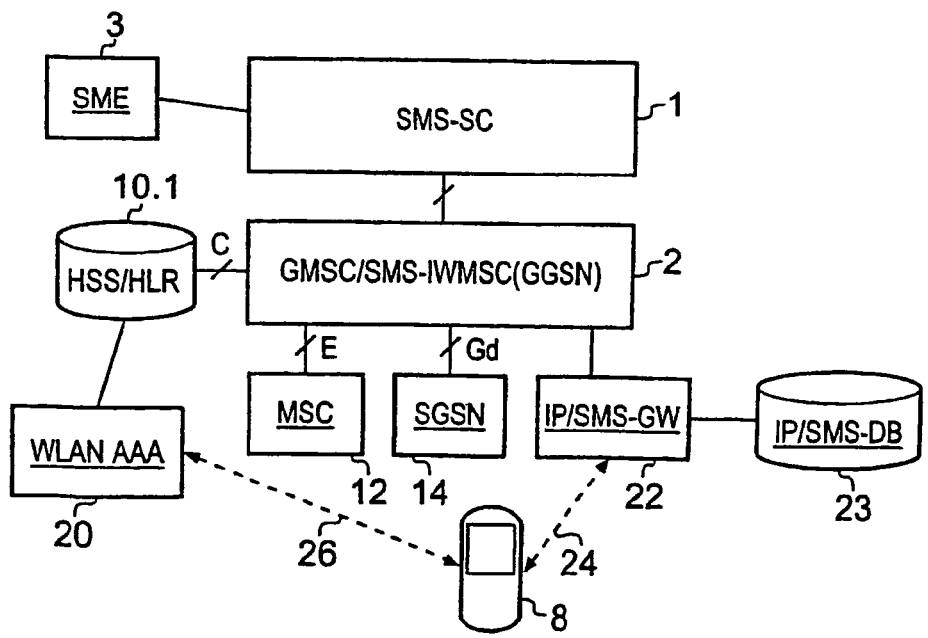
FIG. 2 is a schematic block diagram of a system corresponding to the system shown in FIG. 1, adapted to deliver an SMS message to an IP address.

FIG. 2 provides a illustration of the GSM/UMTS shown in FIG. 1, which has been adapted to communicate an SMS message to a mobile user equipment which is currently attached to an access network operating in accordance with the Internet Protocol (IP). The IP network to which the mobile is attached may be a Wireless-LAN or an ADSL network providing an IP communication layer. This may be because, for example, the mobile user equipment has roamed to a location where communication via for example a Wireless-LAN provides more favourable radio communication conditions than a GSM/U TS network. Accordingly, the mobile user equipment is provided with an IP address to which an SMS message should be sent.

The term Home Location Register as used with reference to FIG. 1 is also referred to as a Home Subscriber Server (HSS), particularly in relation to UMTS networks. In order to provide a generalisation of the function provided by the HLR/HSS within a mobile radio network, the term home location database will be adopted with respect to the embodiment illustrated in FIG. 2.

The embodiment of the invention shown in FIG. 2 includes an Authentication, Authorisation and Accounting (AAA) server 20 which is provided with a communication channel 22 to the home location database 10.1. Also shown in FIG. 2 is an Internet Protocol/SMS (IP/SMS) gateway 22. The IP/SMS gateway 22 forms part of an IP network via which the mobile is currently attached and communicating using the Internet Protocol. An IP/SMS database 23 is attached to the IP/SMS gateway 22. As will be explained shortly, the IP/SMS database 23 is arranged to store an IP address of the mobile user equipment when the mobile is acting as an IP client due to its attachment to the IP network.

As illustrated in FIG. 2, the mobile user equipment is no longer communicating via the GSM/UMTS network, but as shown by broken lines 24, 26 communicates via an IP network such as a Wireless-LAN. In some embodiments the AAA server 20 may form part of the HSS/HLR 10.1. The AAA server also operates to authenticate the mobile user equipment to communicate using the IP network and to authorise communication via the IP network. Following authorisation, the AAA server informs the home location database that an SMS message should be sent to the mobile user equipment via the IP/SMS gateway 22. Accordingly the home location database is arranged to include the address of the IP/SMS gateway which is stored in association with the subscriber identity number. Furthermore, according to one embodiment, the AAA server may also determine the IP client address of the mobile user equipment and arrange for this to be stored in the IP/SMS database in association with the subscriber identity number of the mobile.

Communication of an SMS Message to an IP Client Address

With reference to FIG. 2, the system for delivering an SMS message via an IP network includes the SM-SC 1 and the GMSC 2 which operate in accordance with an existing network standard such as that defined in TS 23.040. There is therefore no proposed changes to these elements. An SMS-Inter-Working MSC (SMS-IWMSC) is used rather than the GMSC with reference to delivering SMS messages from the mobile user equipment to the SME in a GSM/UMTS network. FIG. 2 includes the IP/SMS gateway 22 to communicate between the IP client and the GMSC/SMS-IWMSC. Furthermore as indicated above, an enhancement is made to the home location database (HLR/HSS) in order to enable the SMS message to be routed to IP/SMS gateway. The enhancement of the home location database and the operations performed by the IP/SMS gateway to deliver an SMS message to an IP client is provided in the following paragraphs. The IP/SMS gateway 22 is arranged in operation:

- to connect to the GMSC using established Mobile Application Part (MAP) protocols for transport of IP terminated SMS messages, appearing to the GMSC as an MSC or SGSN using the E or Gd reference points;
- to connect to the SMS-IWMSC using established MAP protocols for transport of IP originated SMS messages, appearing to the SMS-IWMSC as an MSC or SGSN using the E or Gd reference points;
- to communicate with the IP client using IP based protocols, maintaining the format and functionality of the SMS message;
- to associate through access to the IP/SMS database, the mobile subscriber identity number (MSISDN) with the IP address of the terminal.

Following receipt of the SMS message by the GMSC 2, GMSC 2 performs a MAP request to the home location database 10.1. The MAP request is "send routing information for short message" as defined in TS 29.002 [2]. The request is for information to determine the address of the MSC or SGSN to which to route the short message. The "send routing information for short message" will normally return the address of the MSC or SGSN for delivery of SMS message. In order to support delivery of SMS messages to the IP client address of the mobile, the home location database 10.1 is arranged to return the address of the IP/SMS gateway 22 in the "send routing information for short message" for the mobile user equipment 8 which is attached to an IP network.

The home location database includes the following functionality:

- an indication that the mobile user equipment is IP connected (e.g. an internal flag) for delivery of SMS;
- the address of the IP/SMS gateway.

Thus the home location database returns the MAP address of the IP/SMS gateway, rather than the MSC address or SGSN address, for mobiles which are IP connected for delivery of SMS messages. In some embodiments the flag indicating that the mobile user equipment is communicating via an IP terminated network is set by the AAA server.

The SMS message is then sent to the IP/SMS gateway by the GMSC 2, following the receipt of the address of the IP/SMS gateway, which has been stored in the home location database 10.1 in association with the subscriber identity number. The IP/SMS gateway is arranged to deliver the SMS message via the IP network to the mobile user equipment at an IP address. However, in order to do so the IP/SMS gateway retrieves the IP address of the mobile user equipment which is stored in the IP/SMS database 23. In some embodiments, the IP/SMS database may be part of the HLR/HSS or an AAA server.

Figure 3:
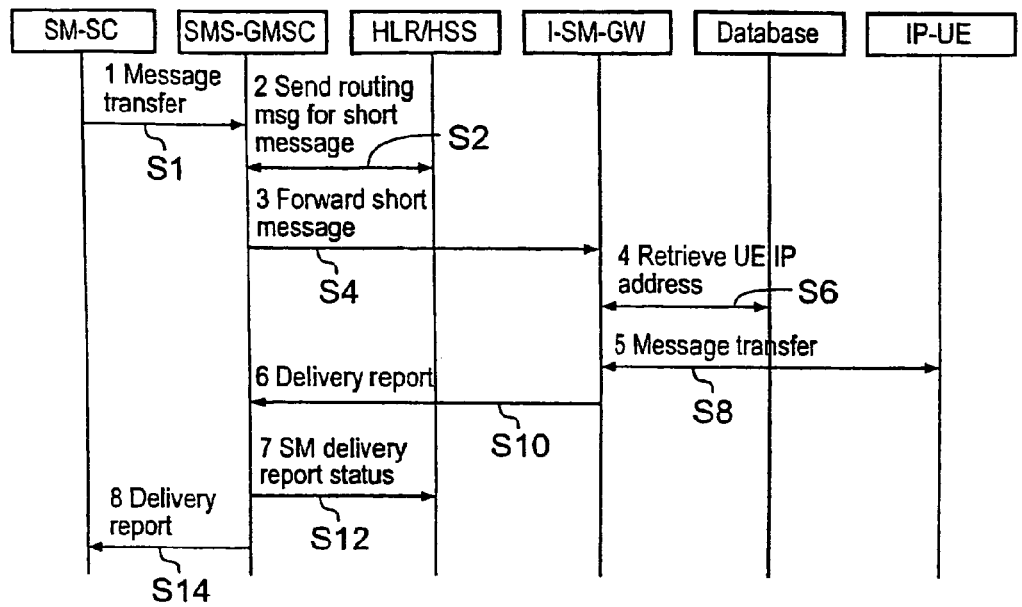
FIG. 3 is a flow diagram illustrating a message sequence for delivering an SMS message to a mobile user equipment via an IP network.

According to embodiments of the invention, an SMS message destined for the mobile user equipment with a destination address identified by a mobile subscriber number (MSISDN) is originated by an SMS enabled Mobile Equipment (SME) and is sent to the SMS-Service Centre 1 according to the standard (see TS 23.040). The message sequence flow for transport of the IP terminated short message from the SMS Service Centre 1 to the mobile user equipment IP client address is represented by the flow diagram shown in FIG. 3. The flow diagram shown in FIG. 3 is based on the message sequence flow according to TS 23.040, and maintains where possible the existing message sequences. The flow diagram shown in FIG. 3 is summarised as follows:

S.1: In FIG. 3, the Short Message-Service Centre (SM-SC) forwards the SMS message to the GMSC (as in TS 23.040).

S.2: The GMSC 2 interrogates the home location database (HLR/HSS) to retrieve routing information "sendRoutingInfoForShortMsg" (See TS 29.002 section 23.1.2) for the mobile user equipment. Where the terminal is registered as being connected to an IP network, the home location database returns the MAP address of IP/SMS Gateway 22.

S.4: The GMSC 2 delivers the SMS message to the IP/SMS Gateway using protocols as if the GMSC were an MSC or SGSN according to the GSM standard in TS 23.040.

S.6: The IP/SMS gateway 22 interrogates the IP/SMS database 23 to identify an IP client address associated with the mobile user equipment 8.

S.8: The IP/SMS gateway 22 delivers the SMS message to the IP client address using "proprietary" mechanisms, e.g. SMS in IP, SMS in MMS, SMS in instant message.

S.10: The IP/SMS gateway 22 sends a delivery report back to the GMSC according to the existing standard (TS 23.040).

S.12: The GMSC sends an SMS message delivery report to the home location database according to the existing standard (as in TS 23.040).

S.14: The GMSC sends an SMS message delivery report to SM-SC according to the existing standard (as in TS 23.040).

Communication of an SMS Originated from an IP Client

Figure 4:
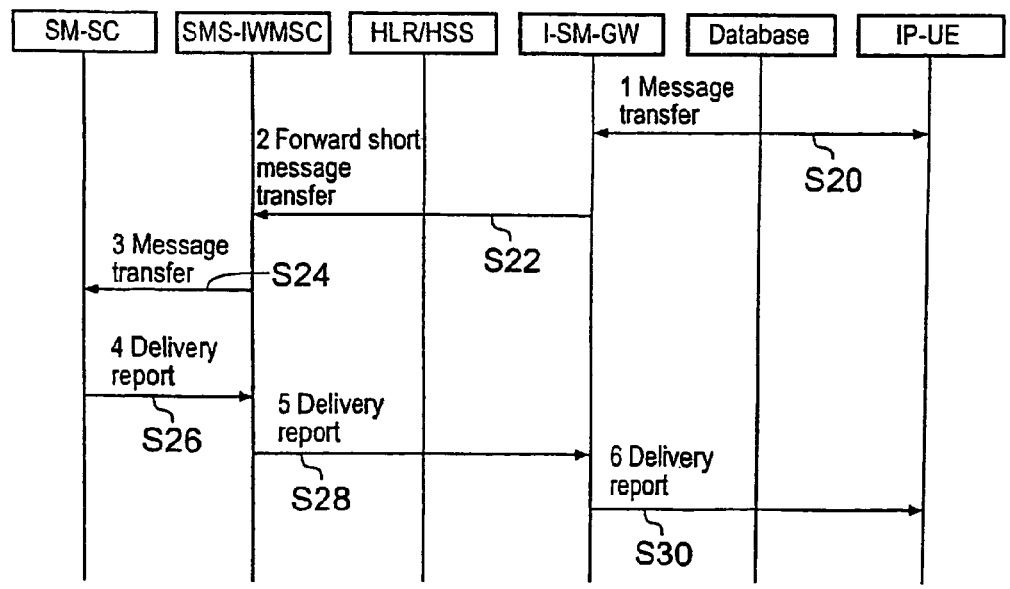
FIG. 4 is a flow diagram illustrating a message sequence for communicating an SMS message originating from the mobile user equipment when acting as an IP client to an SMS enabled Mobile Equipment.

An SMS message may be sent from the mobile user equipment 8, via the IP network (SMS message IP originated) destined for a particular SME 3 (with a destination address identified by a MSISDN). In this case the SMS message is originated in accordance with the format defined in the GSM standard (TS 23.040) and is sent from the IP client address to the IP/SMS gateway 22 using an IP based protocol. A flow diagram illustrating a message sequence flow for transport of the IP originated short message to the SMS Service Centre 1 is provided in FIG. 4. This diagram is based on the message sequence flow defined in the GSM standard (TS 23.040) maintaining where possible the existing message sequences. The flow diagram of FIG. 4 is summarised as follows:

S20: The mobile user equipment 8 acting as an IP client delivers the SMS message, via proprietary mechanism and/or protocol to the IP/SMS gateway 22.

S22: The IP/SMS gateway extracts the SMS message and forwards this to the SMS-InterWorking MSC (SMS-IWMSC) 2 using standard MAP (for example TS 23.040) as if the SMS-IWMSC was an MSC or SGSN;

S24: The SMS-IWMSC forwards the SMS message to the SMS-Switching Centre SMS-SC 1 (for example as specified in TS 23.040);

S26: The SMS-Service Centre (SMS-SC) 1 sends a delivery report to the SMS-IWMSC (for example as specified in TS 23.040);

S28: The SMS-IWMSC sends a delivery report to the IP/SMS gateway 22 (for example as specified in TS 23.040);

S30: The IP/SMS gateway 22 then sends a delivery report to the mobile user equipment 8 using proprietary protocols.

In order to deliver the IP originated short message, the IP/SMS gateway is provided with the address of the SMS-IWMSC. Correspondingly, the address of the SM-SC is required. In one example, the SM-SC address is included in the SMS message by the mobile user equipment. Alternatively, the SMS-Service Centre address can be added by the mobile user equipment or it can be added by the IP/SMS gateway. The IP/SMS gateway could deliver the SMS message directly to the SM-SC if connectivity exists.

Other Embodiments

Embodiments of the present invention provide an interworking of SMS messages with IP clients. The system requires substantially no modification of some of the existing standardised components of the GSM UMTS network such as the SM-SC, GMSC or SMS-IWMSC functions, and requires no changes to the SMS format. No requirement is imposed on the mobile user equipment for the support of MMS or IMS functionality. Some adaptation of the home location database is required in accordance with embodiments of the invention. However, this adaptation maintaining backward compatibility with existing home location database functions such as the HLR and the HSS. Furthermore the IP/SMS gateway provides a single network entity, which supports a choice of protocols for delivery or receipt of SMS messages to or from IP clients and a choice of protocols for retrieval of IP address of the mobile user equipment.

Various further aspects and features of the present invention are defined in the appended claims. Various modifications can be made to the embodiments herein described without departing from the scope of the present invention.

References

[1] 3GPP TS 23.040 Technical Realisation of the Short Message Service (SMS)

[2] 3GPP TS 29.002 Mobile Application Part (MAP) specification

The invention claimed is:

1. A telecommunications system for communicating a Short Message Service (SMS) message to a user equipment using a subscriber identity number terminating on an Internet Protocol network using an Internet Protocol (IP), the user equipment acting as an Internet Protocol (IP) client, the system comprising a short message service centre (SM-SC), a gateway mobile switching centre (GMSC) of an SMS network for communicating SMS messages, an Internet Protocol/SMS (IP/SMS) gateway for communicating between the SMS network and the IP network and a home location database (HLR/HSS) for maintaining address data identifying a current location of a user equipment, the gateway mobile switching centre being operable in response to the SMS message received from the short message service centre to interrogate the home location database for an address to which the SMS message should be sent, the home location database being operable to provide the gateway mobile switching centre with an address of the IP/SMS gateway stored in association with the subscriber identity number, the gateway switching centre being operable to send the SMS message to the IP/SMS gateway, the IP/SMS gateway being operable to retrieve an Internet Protocol address corresponding to the subscriber identity number stored in an IP/SMS database associated with the IP/SMS gateway, and to communicate the SMS message to the user equipment at the retrieved IP address via the IP network, wherein the IP network includes an authentication, authorization and accounting server which is operable to determine the IP/SMS gateway address from the IP network via which the user equipment is communicating, and to communicate the IP/SMS gateway address to the home location database, the IP/SMS gateway address being stored in the home location database in association with the subscriber identity number for retrieval by the gateway mobile switching centre in response to the received SMS message.

2. The system as claimed in claim 1, wherein the authentication, authorization and accounting server is operable to determine the IP address of the user equipment when communicating via the IP network, and to communicate the IP address of the user equipment to the IP/SMS gateway for storing in the IP/SMS database associated with the IP/SMS gateway for retrieval by the IP/SMS gateway in response to the received SMS message.

3. The system as claimed in claim 2, wherein the home location database is arranged to set for at least the subscriber identity number of the user equipment, a flag indicative of whether the user equipment is currently communicating via the IP network, the address of the IP/SMS gateway to which SMS messages should be sent being stored in association with the flag.

4. The system as claimed in claim 1, wherein the home location database is arranged to set for at least the subscriber identity number of the user equipment, a flag indicative of whether the user equipment is currently communicating via the IP network, the address of the IP/SMS gateway to which SMS messages should be sent being stored in association with the flag.

5. The system as claimed in claim 1, wherein the authentication, authorization and accounting server is operable to set the flag in the home location database to indicate that the user equipment is currently communicating via the IP terminated network, and if not set to indicate that the SMS message should be communicated via a serving support node of a cellular mobile radio network for delivery to the user equipment.

6. A home location database stored on a server, the home location database for maintaining address data identifying a current location of a user equipment, the address data providing an address to which an SMS message addressed to the user equipment at a subscriber identity number should be sent, wherein the home location database is arranged to provide a gateway mobile switching centre with an address of an IP/SMS gateway for communicating the SMS message to the user equipment at the subscriber identity number, when the user equipment is communicating via an Internet Protocol (IP) network using an Internet Protocol, communication being terminated on the IP network and the user equipment acting as an Internet Protocol (IP) client, the address of the IP/SMS gateway being provided by an authentication server, which determines the IP/SMS gateway from the IP network via which the user equipment is communicating the home location database being arranged to store for at least the subscriber identity number of the user equipment, a flag indicative of whether the user equipment is currently communicating via the IP network and acting as an Internet Protocol (IP) client, and if the flag is set to indicate that the user equipment is currently communicating via the IP network, an address of the IP/SMS gateway to which SMS messages should be sent.

7. A method of communicating a Short Message Service (SMS) message to a user equipment using a subscriber identity number terminating on an Internet Protocol (IP) network using an Internet Protocol (IP), the user equipment acting as an Internet Protocol (IP) client, the method comprising
maintaining address data identifying a current location of the user equipment in a home location database,
receiving the SMS message at a gateway mobile switching centre (GMSC) of an SMS network for communicating the SMS message,
providing, to the gateway mobile switching centre, from the home location database an address of an Internet Protocol/SMS gateway for communicating between the SMS network and the IP network,
sending the SMS message to the IP/SMS gateway,
retrieving the IP address corresponding to the subscriber identity number from an IP/SMS database associated with the IP/SMS gateway, and
communicating the SMS message to the user equipment at the retrieved IP address via the IP network, wherein the maintaining the address data comprises
determining the IP/SMS gateway address from the IP network via which the user equipment is communicating using an authentication server connected to the IP network,
communicating the IP/SMS gateway address from the authentication server to the home location database, and
storing the IP/SMS gateway address in the home location database in association with the subscriber identity number for retrieval in response to the received SMS message.

8. The method as claimed in claim 7, the method comprising
determining the IP address of the user equipment when communicating via the IP network,
communicating the IP address of the user equipment to the IP/SMS gateway, and
storing the IP address of the user equipment in an IP/SMS database associated with the IP/SMS gateway, the IP address being stored in association with the subscriber identity number for retrieval in response to the received SMS message.

9. The method as claimed in claim 8, comprising
setting a flag in the home location database
for at least the subscriber identity number of the user equipment, the flag being indicative of whether the user equipment is currently communicating via the IP network, the address of the IP/SMS gateway to which SMS messages should be sent being stored in association with the flag.

10. The method as claimed in claim 7, comprising
setting a flag in the home location database
for at least the subscriber identity number of the user equipment, the flag being indicative of whether the user equipment is currently communicating via the IP network, the address of the IP/SMS gateway to which SMS messages should be sent being stored in association with the flag.

11. The method as claimed in claim 7, comprising
setting the flag in the home location database to indicate that the user equipment is currently communicating via the IP terminated network, and
not setting the flag to indicate that the SMS message should be communicated via a serving support node of a cellular mobile radio network for delivery to the user equipment.

12. A telecommunications system for communicating a Short Message Service (SMS) message to a user equipment using a subscriber identity number terminating on an Internet Protocol (IP) network using an Internet Protocol (IP), the user equipment acting as an Internet Protocol (IP) client, the system comprising
means for maintaining address data identifying a current location of the user equipment in a home location database,
means for receiving the SMS message at a gateway mobile switching centre (GMSC) of an SMS network for communicating the SMS message,
means for providing, to the gateway mobile switching centre, from the home location database an address of an Internet Protocol/SMS gateway for communicating between the SMS network and the IP network,
means for sending the SMS message to the IP/SMS gateway,
means for retrieving the IP address corresponding to the subscriber identity number from an IP/SMS database associated with the IP/SMS gateway, and means for communicating the SMS message to the user equipment at the retrieved IP address via the IP network, wherein the means for maintaining the address data comprises means for determining from an authentication server forming part of the IP network the IP/SMS gateway address via which the user equipment is communicating, means for communicating the IP/SMS gateway address from the authentication server to the home location database, and means for storing the IP/SMS gateway address in the home location database in association with the subscriber identity number for retrieval in response to the received SMS message.

13. The telecommunications system as claimed in claim 12, comprising means for determining an Internet Protocol (IP) address of the user equipment when communicating via the IP network, means for communicating the IP address of the user equipment to an IP/SMS gateway, and means for storing the IP address of the user equipment in the IP/SMS database associated with the IP/SMS gateway, the IP address being stored in association with the subscriber identity number, for retrieval in response to the SMS message.

14. The telecommunications system as claimed in claim 13, comprising means for setting a flag in the home location database for at least the subscriber identity number of the user equipment, a flag indicative of whether the user equipment is currently communicating via the IP network, the address of the IP/SMS gateway to which SMS messages should be sent being stored in association with the flag.

15. The telecommunications system as claimed in claim 12, comprising means for setting a flag in the home location database for at least the subscriber identity number of the user equipment, a flag indicative of whether the user equipment is currently communicating via the IP network, the address of the IP/SMS gateway to which SMS messages should be sent being stored in association with the flag.

16. A network of devices for communicating a Short Message Service (SMS) message to a mobile device using a subscriber identity number terminating on an Internet Protocol network using an Internet Protocol (IP), the mobile device acting as an Internet Protocol (IP) client, the network of devices comprising a short message entity (SME), a short message service centre (SM-SC), an SMS-Inter-Working mobile switching centre (SMS-IWMSC) for delivering SMS messages from the mobile device to the SME, a gateway mobile switching centre (GMSC) of an SMS network for communicating SMS messages, an Internet Protocol/SMS (IP/SMS) gateway for communicating between the SMS network, the mobile device and the IP network and a home location database (HLR/HSS) for maintaining address data identifying a current location of the mobile device, the gateway mobile switching centre being operable in response to the SMS message received from the short message service centre to interrogate the home location database for an address to which the SMS message should be sent, the home location database being operable to provide the gateway mobile switching centre with an address of the IP/SMS gateway stored in association with the subscriber identity number, the gateway switching centre being operable to send the SMS message to the IP/SMS gateway, the IP/SMS gateway being operable to retrieve an Internet Protocol address corresponding to the subscriber identity number stored in an IP/SMS database associated with the IP/SMS gateway, and to communicate the SMS message to the mobile device at the retrieved IP address via the IP network, wherein the IP network includes an authentication server which is operable to determine the IP/SMS gateway address from the IP network via which the mobile device is communicating, and to communicate the IP/SMS gateway address to the home location database, the IP/SMS gateway address being stored in the home location database in association with the subscriber identity number for retrieval by the gateway mobile switching centre in response to the received SMS message, wherein the home location database sets for at least the subscriber identity number of the mobile device, a flag indicative of whether the mobile device is currently communicating via the IP network, the address of the IP/SMS gateway to which SMS messages should be sent being stored in association with the flag.

* * * * *